Feb. 25, 1936.                    H. J. CRINER                    2,032,118
                              BREAD SLICING MACHINE
                             Filed Oct. 12, 1934            2 Sheets-Sheet 2
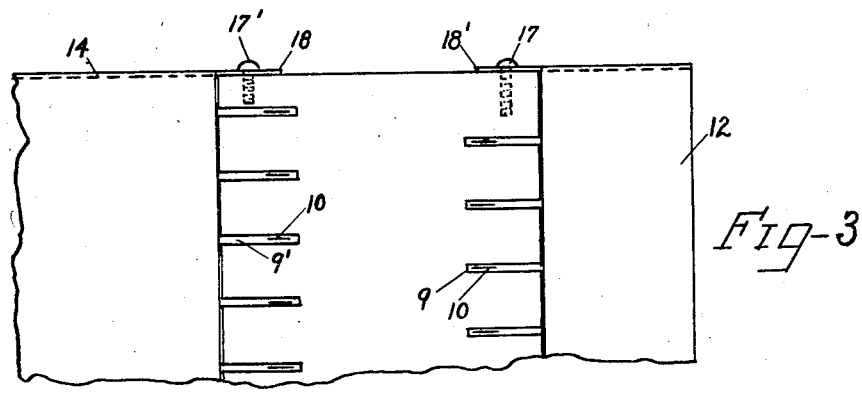
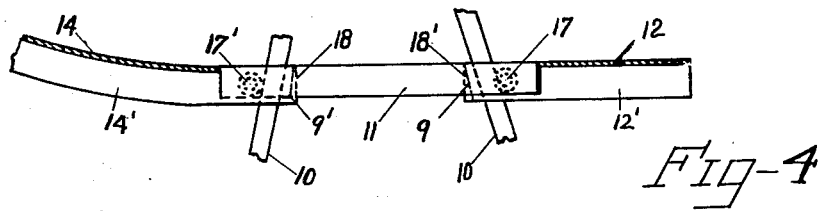
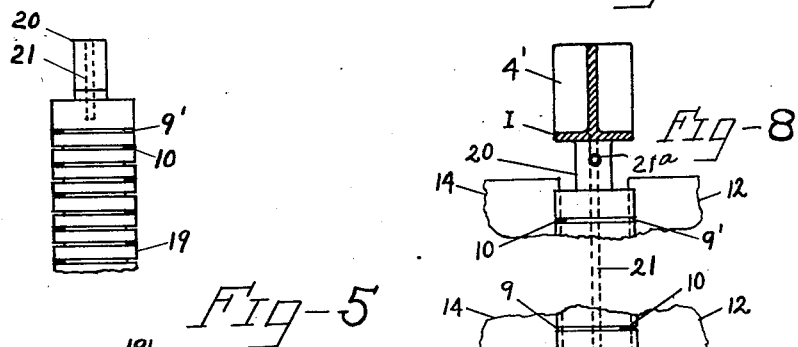
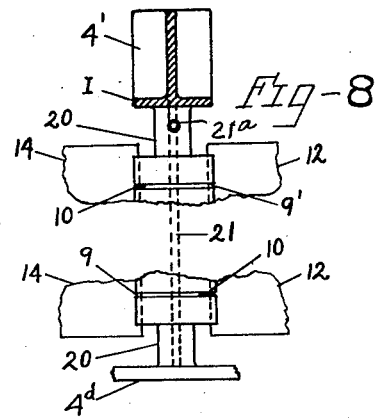

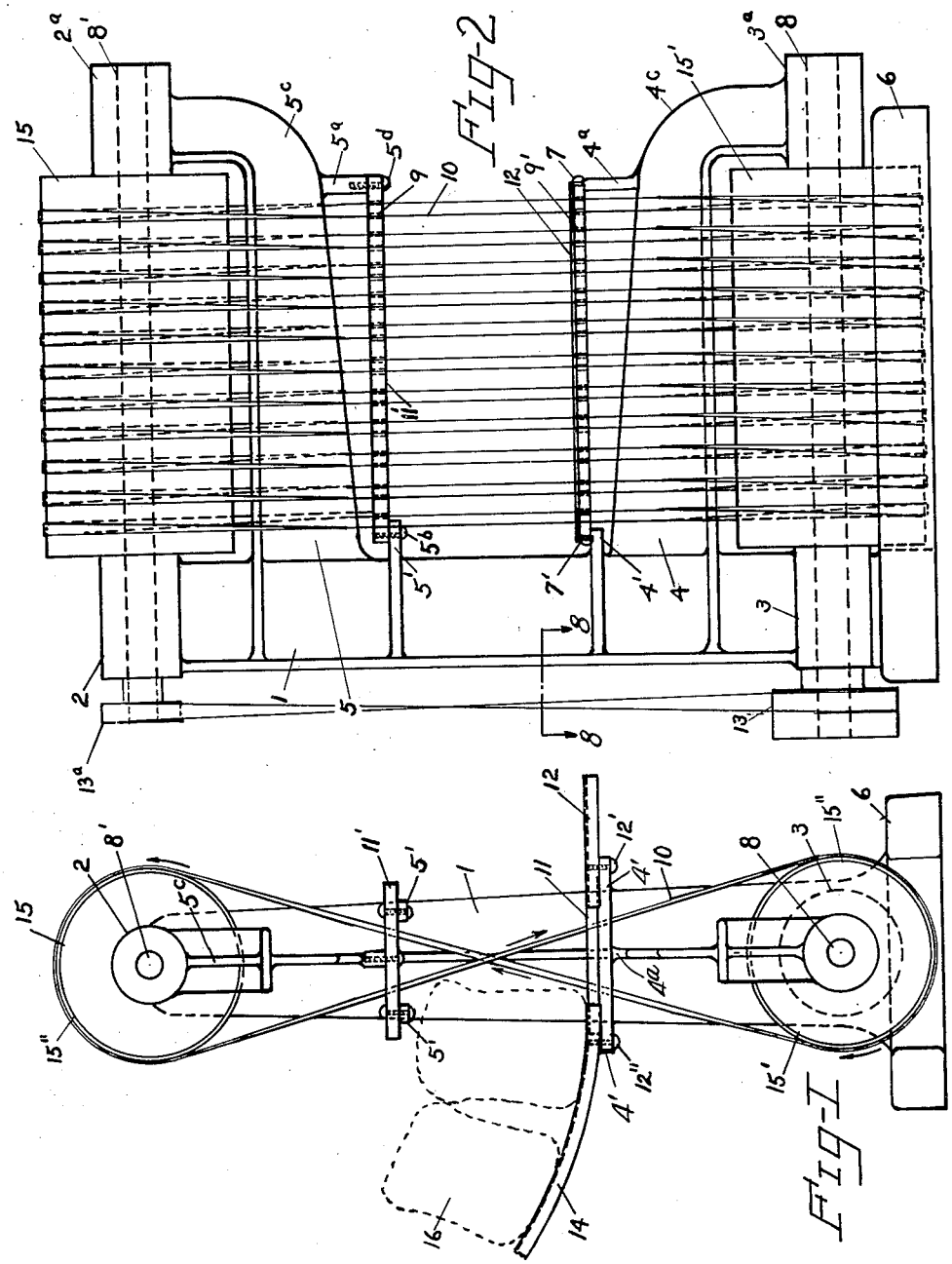

Patented Feb. 25, 1936

2,032,118

UNITED STATES PATENT OFFICE 2,032,118

BREAD SLICING MACHINE

Harry J. Criner, Davenport, Iowa

Application October 12, 1934, Serial No. 748,011

11 Claims. (Cl. 146—88)

My invention relates to improvement in bread slicing machines of the multiple, endless band type.

The objects of my invention are:

To provide improved means for supporting and feeding the bread while being sliced in such a machine; to provide unitary means for supporting the bread while being sliced and for guiding the blades while doing the slicing; to provide improved means for guiding multiple, crossed, endless slicing blades; to provide simple means by which the gauge or spacing of multiple, crossed, endless band blades may be readily changed or adjusted; to provide improved means for replacing broken blades in a multiple, endless band blade slicing machine.

I attain these objects by the means illustrated in the accompanying drawings, in which,—

Figure 1 is an end elevation of my machine from the right of Figure 2;

Figure 2 is a front elevation of my machine with part of the feed table omitted to better show the remaining construction;

Figure 3 is a detail plan view of a portion of the divided feed table with intervening stationary guiding and supporting plate;

Figure 4 is a sectional detail of a portion of the feed table and intervening stationary guide plate;

Figure 5 is a detail plan view of an alternate form of supporting and guiding mechanism;

Figure 6 is a detail fractional elevation showing rotary guides, with feed board in section;

Figure 7 is similar to Figure 6, but shows the rotary guides adapted to act as a support and feeding means for the bread while being sliced by the blades;

Figure 8 is a detail plan view, showing a portion of the post, 1, in section on the line 8—8 of Figure 2.

My machine comprises a vertical frame member or post, 1, having formed integral therewith laterally extending feet or bases, 6. The post and feet are preferably formed of a single casting strengthened and reenforced with ribs or flanges cast integral therewith.

Laterally extending arms, 4 and 5, are formed integral with the post, 1, or suitably united thereto. These arms are preferably formed of modified T-section, with a vertical web or transverse flange united thereto.

The lower arm, 4, has its outer end turned downward substantially at a right angle to the horizontal portion thereof and formed into a suitable bearing, 3a, corresponding to a similar bearing, 3, formed in the lower portion of the post, 1.

The upper arm has its outer end turned upwardly substantially at a right angle and formed with a bearing, 2a, corresponding to a similar bearing, 2, formed in the upper part of the post, 1. A shaft, 8 is revolvably mounted in the bearings, 3 and 3a, and a corresponding shaft, 8', is revolvably mounted in the bearings, 2 and 2a.

A multiple band pulley, 15, is rigidly mounted upon the shaft, 8', between the bearings, 2 and 2a. A similar pulley, 15', is rigidly mounted upon the shaft, 8, between the bearings, 3 and 3a.

A plurality of endless cutting blades are mounted upon the pulleys, 15 and 15', in figure 8 form, the crossing point being midway between the pulleys. These blades are preferably made of narrow, thin strips of stainless spring or saw steel and are sharpened upon one edge. The cutting edge may be plain, serrated, scalloped, sinuous or in such other form as may be desired.

For convenience I refer to the cutting edge as the front of the blade and to the unsharpened edge of the blade as the back. For convenience I also refer to the left of the machine as shown in Figure 1 as the front or feed end and to the right of it as the rear end thereof.

I also refer to the left end of the arms, 4 and 5, as the inner end and to the right of the arms, 4 and 5, as the outer end thereof.

The pulleys, 15 and 15', are preferably formed with a resilient surface so as to allow for slight differences in the length of the blades, 10, and to give a degree of flexibility to the operation thereof. This may be accomplished by using a soft pulley or by using a hard pulley with a resilient covering as shown at 15''.

The surface of the pulleys, however, is made of uniform curvature and size so that the blades may be moved along laterally thereon when it is desired to install them in the first instance or to change the position of them in order to put on a new blade in case one blade breaks.

The blades are given a half turn between the upper and lower pulleys so that at the crossing points of the bands, the cutting edges are turned to the left as shown in Figure 1, and the blades at that point stand at right angles to the portions of the blades in contact with the pulleys.

In order to extend this angular portion of the blades to a length equal to the height of the loaves of bread being sliced, I provide transverse guide plates, 11 and 11', which have their inner ends supported by lugs, 4' and 5', formed integral with or united to the post, 1, and their outer ends are supported by lugs or shoulders, 4a and 5a, formed integral with the arms, 4 and 5, respectively.

A divided breadboard or table composed of a front section, or feed table, 14, and a rear section or discharge table 12, is suitably united to the machine below the crossing point of the cutting blades and supported by lugs 4' united to the post, 1, and brace, 4a, with crossbar or head 4d united to the arm, 4. The bread table may be sloping or level as desired and may be either straight or curved, but the inner ends of the two sections are spaced apart slightly farther than the distance between the blades where they pass the bread table.

The guide plate, 11, is provided with staggered transverse slots, 9 and 9', extending from the front and rear edges of the plate, 11, towards the middle thereof, adapted to permit the passage of the cutting blades through the plate, 11.

The sections, 12 and 14, of the bread table are preferably formed of a broad metal plate having lateral, downwardly extending flanges, 12' and 14', respectively at each edge thereof. The flanges, 12' and 14', are extended inwardly as shown in Figure 4 and to these extended flanges the guide plate, 11, is secured by set screws, 17 and 17', or other suitable means. Staggered slots, 9 and 9', are cut or formed in the front and rear edges of the guide plate, 11, each slot being wide enough to permit the passage of its corresponding blade and narrow enough to act as a guide for such blade so as to assist in turning it into the required position parallel with the front to rear axis of the machine.

The guide plate, 11, when mounted as described, is readily detachable and may, after taking out the set screws, be turned laterally into a vertical position and then withdrawn from between the cutting blades or bands without disturbing either section of the bread table. The upper surface of the guide plate, 11, is so positioned as to be in the same plane as the adjoining portions of the bread table and the guide plate, 11, will thus act as a support to the bread while traveling past the blades.

A similar guide plate, 11', is mounted upon lugs, 5' and 5a, formed integral with the post, 1, and the arms, 5, respectively. The plate, 11', is mounted at a distance above the plate, 11, corresponding to the height of the loaves of bread to be sliced and may be made adjustable for loaves of various heights.

The plate, 11', may be removed by taking out the set screws, 5b and 5d, and turning the board laterally into an upright position, in which position it may be withdrawn from between the blades.

In order to reduce the sliding friction of the blades upon the guides in the guide plate, 11, I have shown in Figures 5, 6, 7, and 8, an alternate form comprising rotary guides. These rotary guides are mounted upon shafts, 21, which in turn are revolvably mounted in bosses, 20, formed integral with the post, 1, and the lugs, 4a and 5a, respectively.

When rotary guides are used with the plate, 11, the slots in the plate, 11, may be widened so as to avoid contact with the blades.

When the plate, 11, is omitted, the rotary guides, 19, should be made of sufficient size and so positioned that the top of the rotary guides, 19, is substantially level with the top of the adjacent sections, 14 and 12, of the bread table and when so positioned, the guides will not only act as guides for the blades, but will facilitate and speed up the travel of the loaves of bread while being sliced.

Similar rotary guides, 19', may be mounted upon a shaft, 21', in bosses, 20', a suitable distance above the crossing point of the blades and when so located, may be spaced at the proper distance above the level of the bread table to permit the rotary guides, 19', to contact the tops of the loaves of bread and thus assist in passing them along while being sliced.

The rotary guides, 19 and 19', may be formed of separate discs mounted upon the shafts, 20 and 20', or all of the rotary guides, 19, may be formed integral and slots cut therein to the depth necessary to support the rear edges of the slicing blades. One advantage of this form of structure is that it tends to equalize the stresses upon the slicing blades and to prevent the accumulation of slack therein at one point.

The shafts, 21, may be in the form of short shafts secured in the ends of the integral rotary guide units, 19, as shown in Figure 5, or they may extend entirely through the guide units as shown in Figure 8 and may be secured in place by a stud bolt, 21a, or other suitable means.

When it is necessary to replace a blade on account of breakage, either the guide plates, 11 or 11', or the rotary guides, 19 and 19', may be removed. The blades remaining upon the pulleys can then be moved into the proper position to leave a vacancy at the outer ends of the pulleys and a new band can then readily be slipped upon the outer ends of the pulleys.

In order to provide means to adapt this machine for the slicing of bread into slices of various thicknesses, I provide a plurality of guide plates, 11 and 11', each pair having the slots therein spaced at a given distance and the distances of such spaces being different in the different pairs of guides. Likewise, when rotary guides are used, I provide a plurality of pairs of rotary guides, each pair having a given uniform spacing and the different pairs being spaced differently so as to provide for different thicknesses.

When it is desired to change the gauge of a given machine, the guide plates or rotary guides therein are taken out, the blades are then moved into the desired spacial relation and a new set of guides, either stationary or rotary, mounted therein having the desired spacing. It is thus a relatively simple matter to change the machine so as to adapt it from time to time to slice loaves of bread into the desired thicknesses.

In Figure 2 I have shown a drive pulley, 13, keyed upon the shaft, 8, with the upper shaft, 8', left to run free. When so arranged, the upper pulley will be driven by the blades which in turn are driven by the lower pulley, but if desired, a drive pulley, 13a, may be secured upon the shaft, 8', as shown in dotted lines in Figure 2, and both pulleys may be driven by the same belt. I prefer to drive both shafts, 8 and 8', by a single pulley, 13, so as to avoid any inequalities or differences in stretch or other conditions that might exist between the drive belt and the cutting blades.

In the operation of my machine, power is applied to the pulley, 13, and shaft, 8, to cause the blades to travel in the direction shown by the arrows in Figure 1. The bread is then placed upon the section, 14, of the bread table and may be fed to the blades either manually, by gravity or other means as desired. The oblique movement of the blades will have a slight tendency to assist in the forward movement of the bread and when rotary guides are used as supports, they will bear against the bread and facilitate the forward movement thereof. As the bread passes through or beyond the cutting blades, it will be received on the discharge section, 12, of the table and may be taken away by manual or mechanical means as desired, or if desired, fed directly to the wrapping machine.

I do not limit my claims to the precise forms shown in the drawings, for various changes may be made in the size and form without departing from the spirit of my invention.

I claim:

1. In a bread slicing machine of the endless-band type, a frame, upper and lower pulleys or drums revolvably mounted therein, a plurality of narrow endless-band cutting blades mounted upon the drums in figure 8 form, spaced and crossing substantially midway between the drums, spaced apart feed and discharge tables removably united to the frame at the front and rear of the crossed blades, a plurality of rotary blade spacers, adapted also to act as a support and carrier for the bread while being sliced, revolvably mounted between the feed and discharge tables the top of the periphery of said rotary blade spacers being positioned on the level of the feed and discharge tables, and means to drive the pulleys in opposite directions.

2. In a bread slicing machine of the endless-band type, a frame, upper and lower pulleys or drums revolvably mounted therein, a plurality of narrow endless-band cutting blades mounted upon the drums in figure 8 form, spaced and crossing substantially midway between the drums, a shaft removably united to the frame, between the crossed blades and below the point of crossing thereof, a cylindrical rotary guide revolvably mounted upon the shaft and having a plurality of deep grooves in the periphery thereof equal in number to double the number of band blades, and the alternate grooves being adapted to contact the cutting blades at the front and rear thereof respectively, and means to drive the pulleys in opposite directions.

3. In a bread slicing machine of the endless-band type, a frame, upper and lower pulleys or drums revolvably mounted therein, a plurality of narrow endless-band cutting blades mounted upon the drums in figure 8 form, spaced and crossing substantially midway between the drums, a feed table united to the frame at the front of the crossed blades, a shaft removably united to the frame, between the crossed blades and below the point of crossing thereof, a cylindrical rotary guide revolvably mounted upon the shaft and having a plurality of deep grooves in the periphery thereof equal in number to double the number of band blades, and the alternate grooves being adapted to contact the cutting blades at the front and rear thereof respectively, the top of the periphery of said guide being positioned at the level of the feed table and adapted to support each loaf of bread during the slicing thereof, and means to drive the pulleys in opposite directions.

4. In a bread slicing machine of the endless-band type, a frame, upper and lower pulleys or drums revolvably mounted therein, a plurality of narrow endless-band cutting blades mounted upon the drums in figure 8 form, spaced and crossing substantially midway between the drums, a feed table united to the frame at the front of the crossed blades, a shaft removably united to the frame between the crossed blades and below the point of crossing thereof, a cylindrical rotary guide revolvably mounted upon the shaft and having a plurality of deep grooves in the periphery thereof equal in number to double the number of band blades, and the alternate grooves being adapted to contact the cutting blades at the front and rear thereof respectively, the periphery of said guide being positioned at the level of the feed table and adapted to support each loaf of bread and to carry it forward during the slicing thereof, and means to drive the pulleys in opposite directions.

5. A multiple-blade bread slicing machine with a frame comprising a vertical post with spaced upper and lower arms laterally extending therefrom, upper and lower shafts revolvable mounted in the post and the upper and lower arms, multiple-band pulleys keyed upon the upper and lower shafts respectively, a plurality of narrow endless-band cutting blades mounted upon the upper and lower pulleys in figure 8 form and crossing between the upper and lower arms, said arms being positioned between the upper and lower pulley shafts, a feed table united to the frame at the front of the crossed blades, a combined rotary bread support and blade guide and spacer removably united to the frame positioned between the blades and below the crossing point thereof the top of the periphery thereof being positioned at the level of the feed table and adapted to guide and permit travel of the blades therethrough and to support the bread while being sliced, and carry same forward against the cutting edges of the blades, and means to drive the pulleys in opposite directions.

6. In a bread slicing machine of the endless-band type, a frame, upper and lower pulleys or drums revolvably mounted therein, a plurality of narrow endless-band cutting blades mounted upon the drums in figure 8 form, spaced and crossing substantially midway between the drums, spaced apart feed and discharge tables removably united to the frame at the front and rear of the cross blades, a plurality of rotary blade spacers the top of the periphery thereof being positioned at the level of the feed and discharge tables and adapted also to act as a support and carrier for the bread while being sliced revolvably mounted between the feed and discharge tables, means spaced above the crossing point of the blades to prevent upward displacement of the bread while being sliced and means to drive the pulleys in opposite directions.

7. In a bread slicing machine of the endless-band type, a frame, upper and lower pulleys or drums revolvably mounted therein, a plurality of narrow endless-band cutting blades mounted upon the drums in figure 8 form, spaced and crossing substantially midway between the drums, a feed table mounted upon the frame in front of the crossed blades, a shaft removably united to the frame between the crossed blades and below the point of crossing thereof, a cylindrical rotary guide revolvably mounted upon the shaft and having a plurality of deep grooves in the periphery thereof equal in number to double the number of band blades, and the alternate grooves being adapted to contact the cutting blades at the front and rear thereof respectively, the top of the periphery of said guide being positioned at the level of the feed table and adapted to support each loaf of bread and to carry it forward during the slicing thereof, means spaced above the crossing point of the blades to prevent upward displacement of the bread while being sliced and means to drive the pulleys in opposite directions.

8. In a bread slicing machine of the endless-band type, a frame, upper and lower pulleys or drums revolvably mounted therein, a plurality of narrow endless-band cutting blades mounted upon the drums in figure 8 form, spaced and crossing substantially midway between the drums, a bread table comprising a front section united to the frame in front of the cutting blades, a rear section united to the frame at the rear of the cutting blades, and an intermediate section, means for detachably uniting said intermediate section to the front and rear sections and in line therewith, said intermediate section being below the crossing point of and between the ascending and descending series of blades, the opposite sides of said intermediate section having slots therein forming guides and spacers for the knives, the slots in one side being staggered in respect to the slots of the other side and extending to and opening on the respective side edge of the section forming staggered fingers extending toward the front and rear, said intermediate section, including the fingers, being adapted to support the loaves of bread during the slicing operation, and means to drive the pulleys in opposite directions.

9. In a bread slicing machine of the endless-band type, a frame, upper and lower pulleys or drums revolvably mounted therein, a plurality of narrow endless-band cutting blades mounted upon the drums in figure 8 form, spaced and crossing substantially midway between the drums, a bread table comprising a front section, means for detachably uniting said front section to the frame in front of the cutting blades, a rear section, means for detachably uniting said rear section to the frame at the rear of the cutting blades, and an intermediate section, means for detachably uniting said intermediate section to the front and rear sections and in line therewith, said intermediate section being below the crossing point of and between the ascending and descending series of blades, the opposite sides of said intermediate section having slots therein forming guides and spacers for the knives, the slots in one side being staggered in respect to the slots of the other side and extending to and opening on the respective side edge of the section forming staggered fingers extending toward the front and rear, said intermediate section, including the fingers being adapted to support the loaves of bread during the slicing operation, and means to drive the pulleys in opposite directions.

10. In a bread slicing machine of the endless-band type, a frame, upper and lower pulleys or drums revolvably mounted therein, a plurality of narrow endless-band cutting blades mounted upon the drums in figure 8 form, spaced and crossing substantially midway between the drums, a bread table comprising a front section, means for detachably uniting said front section to the frame in front of the cutting blades, a rear section, means for detachably uniting said rear section to the frame at the rear of the cutting blades, and an intermediate section, means for detachably uniting said intermediate section to the front and rear sections at the level of the adjacent edges of the front and rear sections, said intermediate section being below the crossing point of and between the ascending and descending series of blades, the opposite sides of said intermediate section having slots therein forming guides and spacers for the knives, the slots in one side being staggered in respect to the slots of the other side and extending to and opening on the respective side edge of the section forming staggered fingers extending toward the front and rear, said intermediate section, including the fingers being adapted to support the loaves of bread during the slicing operation, and means to drive the pulleys in opposite directions.

11. In a bread slicing machine of the endless-band type, a frame, upper and lower pulleys or drums revolvably mounted therein, a plurality of narrow endless-band cutting blades mounted upon the drums in figure 8 form, spaced and crossing substantially midway between the drums, a bread table comprising a front section, means for detachably uniting said front section to the frame in front of the cutting blades, a rear section, means for detachably uniting said rear section to the frame at the rear of the cutting blades, and an intermediate section, means for detachably uniting said intermediate section to the front and rear sections and in line therewith, said intermediate section being below the crossing point of and between the ascending and descending series of blades, the opposite sides of said intermediate section having slots therein forming guides and spacers for the knives, the slots in one side being staggered in respect to the slots of the other side and extending to and opening on the respective side edge of the section forming staggered fingers extending toward the front and rear, said intermediate section, including the fingers being adapted to support the loaves of bread during the slicing operation, said intermediate section being removable without disturbing either the blades or the front or rear sections of the bread table, and means to drive the pulleys in opposite directions.

HARRY J. CRINER.